United States Patent
Hirasa et al.

(10) Patent No.: US 7,414,082 B2
(45) Date of Patent: Aug. 19, 2008

(54) RECORDING LIQUID AND INK JET RECORDING METHOD

(75) Inventors: Takashi Hirasa, Yokkaichi (JP); Kazunori Maruyama, Yokkaichi (JP); Naomi Fujimori, Yokkaichi (JP)

(73) Assignees: Mitsubishi Chemical Corporation, Tokyo (JP); Mikuni Color Ltd., Hyogo-ken (JP)

( * ) Notice: Subject to any disclaimer, the term of this patent is extended or adjusted under 35 U.S.C. 154(b) by 0 days.

(21) Appl. No.: 10/329,867

(22) Filed: Dec. 26, 2002

(65) Prior Publication Data

US 2003/0166742 A1   Sep. 4, 2003

Related U.S. Application Data

(63) Continuation-in-part of application No. 09/880,690, filed on Jun. 13, 2001, now abandoned.

(30) Foreign Application Priority Data

Jun. 14, 2000   (JP)   ............... 2000-178809
Sep. 22, 2000   (JP)   ............... 2000-288982

(51) Int. Cl.
   *C09D 11/00*   (2006.01)
(52) U.S. Cl. ............... 523/160; 523/161; 524/555; 524/566; 524/590; 106/31.6
(58) Field of Classification Search ............... 523/160, 523/161; 524/555, 556, 590; 106/31.6
   See application file for complete search history.

(56) References Cited

U.S. PATENT DOCUMENTS

| 5,640,187 | A | * | 6/1997 | Kashiwazaki et al. ....... 347/101 |
| 5,696,182 | A | | 12/1997 | Kashiwazaki et al. ....... 523/161 |
| 5,700,867 | A | * | 12/1997 | Ishiyama et al. ............ 524/539 |
| 5,889,083 | A | * | 3/1999 | Zhu ........................... 523/161 |
| 5,905,102 | A | | 5/1999 | Nagasawa et al. ........... 523/161 |
| 6,117,552 | A | | 9/2000 | Hanada et al. ............. 428/411.1 |
| 6,123,759 | A | | 9/2000 | Mise et al. ................. 106/31.9 |
| 6,238,047 | B1 | | 5/2001 | Suzuki et al. ............... 347/105 |
| 6,245,832 | B1 | | 6/2001 | Suzuki et al. ............... 523/160 |
| 6,281,267 | B2 | | 8/2001 | Parazak ...................... 523/160 |
| 6,368,397 | B1 | | 4/2002 | Ichizawa et al. ......... 106/31.65 |
| 6,406,606 | B1 | | 6/2002 | Betto et al. ................... 205/52 |
| H2113 | H | * | 1/2005 | Nichols et al. ............... 523/160 |
| 2002/0075369 | A1 | * | 6/2002 | Ota et al. ..................... 347/100 |
| 2003/0184629 | A1 | * | 10/2003 | Valentini et al. ............ 347/100 |
| 2004/0110865 | A1 | * | 6/2004 | McCovick et al. .......... 523/160 |

FOREIGN PATENT DOCUMENTS

| EP | 0 586 101 A1 | 3/1994 |
| EP | 0 801 119 A1 | 10/1997 |
| EP | 0 835 890 A1 | 4/1998 |

* cited by examiner

*Primary Examiner*—Bernard Lipman
(74) *Attorney, Agent, or Firm*—Edwards Angell Palmer & Dodge LLP; David G. Conlin; Jeffrey D. Hsi

(57) ABSTRACT

The present invention relates to a recording liquid comprising at least:
  a pigment (a); and
  a polymer (b) having one or more types of bond selected from the group consisting of amide bond, urethane bond and urea bond in the molecule, having a weight-average molecular weight of 5000 to 300000 and having an acid value of free acid of not less than 55 mgKOH/g and less than 150 mgKOH/g,
  the surface tension of said recording liquid being 25 to 54 dyne/cm.

12 Claims, No Drawings

RECORDING LIQUID AND INK JET RECORDING METHOD

CROSS REFERENCE TO RELATED APPLICATION

This is a continuation-in-part of application Ser. No. 09/880,690, filed Jun. 13, 2001 now abandoned.

BACKGROUND OF THE INVENTION

The present invention relates to a recording liquid. More particularly, it relates to a recording liquid for ink jet recording or one suited for recording with hand writing instruments, and an ink jet recording method.

Hitherto, aqueous recording liquids (inks) prepared by dissolving an acid dye or direct dye in an aqueous medium or solvent type recording liquids produced by dissolving an oil-soluble dye in an organic solvent have been used as recording liquid for ink jet recording (hereinafter referred to as ink jet recording liquid). Solvent type recording liquids have the problems relating to environmental safety because of use of solvents, and their field of application is limited for inadequacy for office or home use. On the other hand, aqueous recording liquids which are most popularly used for business or domestic ink jet printers involve the problem of unsatisfactory water fastness and light fastness of the prints because of use of water-soluble pigments (dyes). The same holds true with the recording liquids for hand writing instruments.

In order to solve the above problems, there has been proposed and used in some quarters a recording liquid in which a pigment such as carbon black with excellent water fastness and light fastness is dispersed as colorant. However, the conventional recording liquids are unsatisfactory especially in respect of rubbing resistance of the prints and have the problem that the prints may be fouled when they are traced with a marker.

To overcome these problems, studies have been made on the recording liquids in which various types of polymeric material are added as binder. These recording liquids, however, have the disadvantage of being impaired in discharging stability in use because of rise of viscosity or for other reasons, and thus there has yet been available no recording liquid which can satisfy all of the essential requirements, i.e. stability of jetting performance, print density, rubbing resistance and tolerance to marker. Especially when a printing is to be used for a specific purpose such as presentation as a bulletin, the recording method is used primarily in which recording is made on a special recording sheet having an ink receiving layer on the support such as paper or resin film by an ink jet printing system. In this case, when it is tried to obtain good ink jettability and storage stability, there tend to arise the problem that rubbing resistance and gloss of the prints become unsatisfactory in the case of glossy paper having a smooth surface, whilst the print density lowers in the case of matte paper with high surface roughness.

As a result of the present inventors' earnest study to solve the above problems, it has been found that the above problems can be easily attained by containing a specific polymeric material in a pigment-dispersed recording liquid and determining the optimal range of surface tension of the said recording liquid.

The present invention has been attained on the basis of the above finding.

SUMMARY OF THE INVENTION

An object of the present invention is to provide a recording liquid having excellent keeping quality and jettability characteristics, especially one which can provide high print density, rubbing resistance, tolerance to marker, water fastness and light fastness even when recording is made on special glossy paper, special matte paper or normal paper by an ink jet printer or a hand writing instrument.

Another object of the present invention is to provide an ink jet recording method using the said recording liquid.

To attain the above, in the first aspect of the present invention, there is provided a recording liquid comprising at least:

a pigment (a); and a polymer (b) having one or more types of bond selected from the group consisting of amide bond, urethane bond and urea bond in the molecule; having a weight-average molecular weight of 5000 to 300000 and having an acid value of free acid of not less than 55 mgKOH/g and less than 150 mgKOH/g, the surface tension of said recording liquid being 25 to 54 dyne/cm.

In the second aspect of the present invention, there is provided an ink jet recording method comprising using the recording liquid as defined in the above first aspect on a recording sheet having an ink receiving layer on at least one side of the support.

DETAILED DESCRIPTION OF THE INVENTION

The present invention is described in detail below.

First, the pigment (a) used in the present invention is explained. In the present invention, both organic and inorganic pigments can be used, with some typical examples thereof being shown below.

Examples of the pigments used for yellow ink are C.I. Pigment Yellow 1, 2, 3, 12, 13, 14, 16, 17, 73, 74, 75, 83, 93, 95, 97, 98, 114, 128, 129, 151 and 154. Examples of the pigments used for magenta ink are C.I. Pigment Red 5, 7, 12, 48 (Ca), C.I. 48 (Mn), 57 (Ca), 57:1, 112, 123, 168, 184 and 202. Examples of the pigments used for cyan ink are C.I. Pigment Blue 1, 2, 3, 15:3, 15:34, 16, 22, 60:4 and 60.

Other examples of the pigments usable in the present invention include C.I. Pigment Red 209, 122, 224, 177 and 194, C.I. Pigment Orange 43, C.I. Vat Violet 3, C.I. Pigment Violet 19, 23 and 37, C.I. Pigment Green 36 and 7, and C.I. Pigment Blue 15:6 and 209.

In the present invention, it is also possible to use various types of carbon black such as acetylene black, channel black and furnace black, of which channel black and furnace black are preferred, furnace black being especially preferred.

DBP oil absorption of carbon black is usually not less than 60 ml/100 g, preferably not less than 100 ml/100 g, more preferably not less than 140 ml/100 g, in view of print density. Volatile content is usually not more than 8% by weight, preferably not more than 4% by weight. pH is usually adjusted to be 1 to 14, but in view of storage stability of the recording liquid, it is preferably adjusted to be 3 to 11, more preferably 6 to 9. BET specific surface area is usually defined to be not less than 100 m$^2$/g, but it is preferably 150 to 600 m$^2$/g, more preferably 260 to 500 m$^2$/g. Primary particle size of the pigment is usually selected to be not more than 30 nm, preferably not more than 20 nm, more preferably not more than 16 nm, especially not more than 15 nm. DBP oil absorption was determined by JIS K6221 A method and volatile content by JIS K6221 method. Primary particle size is the arithmetic mean (number-average) size determined by observation through an electron microscope.

Concrete examples of the said types of carbon black, which are commercially available, are Color Black FW1, FW2, FW2V, FW18 and FW200, Special Black 6, Color Black S170 (products by Degussa Co., Ltd.), and CONDUCT EX975ULTR (product by Columbian Co., Ltd.).

Further, in the present invention, it is possible to use those of the said pigments which have been subjected to a chemical treatment (oxidation, fluorination, etc.) or which have a dispersant, surfactant or the like bonded physically or chemically thereto (those subjected to a grafting treatment or having a dispersant adsorbed prior to dispersion). Examples of this type of pigment are Cab-o-jet 200 and 300 (products by Cabot Inc.). Among the above-mentioned types of pigment, carbon black is especially preferably used in the present invention.

Now, the polymer (b) used in the present invention is explained. The polymers used in the present invention are those having at least one type of bond selected from the group consisting of amide bond, urethane bond and urea bond in the molecule and also having an acid value of free acid of 55 to 350 mgKOH/g, preferably 55 to 150 MgKOH/g. Examples of such polymers include those obtained by polymerizing a unit having an amide bond such as (meth)acrylamide or vinylpyrrolidone and a unit having an acid group such as (meth)acrylic acid, and those synthesized so as to have an amide bond in the backbone and an acid group in the side chain. It is preferable in terms of rubbing resistance and marker tolerance that these polymers be used as copolymers with other structural units. Those having a hydrophobic group are especially preferred. The expression "(meth)acrylamide" used above signifies "methacrylamide and/or acrylamide", and similarly "(meth) acrylic acid" signifies "methacrylic acid and/or acrylic acid".

The above-mentioned "hydrophobic group" designates an organic group having an aromatic ring, such as phenyl group, benzyl group, naphthyl group, etc., which may be substituted, and other groups such as alkyl group, alkenyl group, alkinyl group, cycloalkyl group, etc, which have 4 or more carbon atoms and may be branched or substituted. Of these groups, the organic groups having 4 to 10 carbon atoms and/or an aromatic ring are preferred. Examples of the monomers having a hydrophobic group are styrene, benzyl (meth)acrylate, ethylhexyl (meth)acrylate, hexyl (meth)acrylate and butyl (meth)acrylate.

Examples of the polymers (b) having an acid value of free acid of 100 to 350 mgKOH/g include acrylamide/ethylhexyl methacrylate/methacrylic acid copolymer, dimethylacrylamide/benzyl methacrylate/methacrylic acid copolymer, diacetoneacrylamide/methyl methacrylate/butyl acrylate/methacrylic acid copolymer, and methacrylamide/styrene/acrylic acid copolymer.

Examples of the polymers having an amide bond include acrylamide, methacrylamide, dimethylacrylamide, and acrylamide and/or methacrylamide derivatives such as diethylacrylamide, propylacrylamide, diisopropylmethacrylamide and diacetoneacrylamide. Of these, acrylamide, methacrylamide, dimethylacrylamide, dimethylmethacrylamide, monomethylacrylamide and monomethylmethacrylamide are preferred in view of storage stability and stability of jetting performance.

The percentage of the monomer having an amide bond in the polymer is usually not less than 10 mol %, preferably 10 to 50 mol %, in view of rubbing resistance and jettability of the recording liquid. The percentage of the hydrophobic monomer in the polymer is usually not less than 10 mol %, preferably not less than 20 mol %, more preferably 20 to 70 mol %, in view of marker tolerance of the print. The ratio of the percentage (mol %) of the monomer having an amide group in the polymer to the percentage (mol %) of the hydrophobic monomer is usually not less than 1/15, preferably not less than 1/5, more preferably not less than 1/3, in view of storage stability and discharging performance of the recording liquid.

As the polymers which have an urethane bond in the molecule and having an acid value of free acid is 55 to 350 mgKOH/g, those with a free acid value of 55 to 150 mgKOH/g are preferred. Examples of such polymers are various types of water-soluble or water-dispersible urethane-based resins (aliphatic urethane resins, aromatic urethane resins, ester-based urethane resins, ether-based urethane resins, carbonate-based urethane resins, etc.) which can be obtained by reacting principally a diisocyanate compound, a diol compound such as polyetherdiol, polyesterdiol, polycarbonatediol, etc., and a diol containing an acid group such as carboxylic group or sulfonic group.

Examples of the said diisocyanate compounds include aliphatic diisocyanate compounds such as hexamethylene diisocyanate and 2,2,4-trimethylhexamethylene diisocyanate, alicyclic diisocyanate compounds such as isophorone diisocyanate, hydrogenated xylylene diisocyanate, 1,4-cyclohexane diisocyanate and 4,4'-dicyclohexylmethane diisocyanate, aromoaliphataic diisocyanate compounds such as xylylene diisocyanate and tetramethylxylylene diisocyanate, aromatic diisocyanate compounds such as toluylene diisocyanate and phenylmethane diisocyanate, and the modified products of these diisocyanate compounds (modified products containing carbodimide, uretodion, uretoimine, etc.).

The said diol compounds include, for example, polyether diols such as polyethylene glycol, polypropylene glycol, polytetramethylene ether glycol and polyhexamethylene ether glycol, polyester diols such as polyethylene adipate, polybutylene adipate, polyneopentyl adipate, poly-3-methylpentyl adipate, polyethylene/butylene adipate and polyneopentyl/hexyl adipate, polylactone diols such as polycaprolactone diol, and polycarbonate diols. Polyether- or polyester-based diol compounds are preferred:

The said diols containing acid groups include, for example, dimethylolacetic acid, dimethylolpropionic acid and dimethylolbutyric acid. Dimethylolpropionic acid is preferred.

The urethane-based resins may be synthesized by the prepolymer process, in which case the low-molecular weight polyhydroxyl compounds can be used. Examples of such low-molecular weight polyhydroxyl compounds include glycols such as mentioned above as the materials of the said polyester diols, their low-mole alkylene oxide adducts, trihydric alcohols such as glycerin, trimethylolethane and trimethylolpropane, and their low-mole alkylene oxide adducts.

The urethane prepolymers may be extended with water or di- or triamine after or while neutralizing the dimethylolalkanoic acid derived acid groups. As the polyamine used for amine extension, usually diamines or triamines, such as hexamethylenediamine, isophoronediamine, hydrazine and piperazine can be cited. AS the base used for the said neutralization, there can be named, for example, alkylamines such as butylamine and triethylamine, alkanolamines such as monoethanolamine, diethanolamine and triethanolamine, and inorganic bases such as morpholine, ammonia and sodium hydroxide.

The polymers having an urea bond in the molecule and a free acid value of 55 to 350 mgKOH/g can be obtained from the said water extension or di- or triamine extension as the polymers having an urethane bond or an urea bond. The polymers having an urea bond alone in the molecule can be obtained from a reaction of a diisocyanate and a diamine containing an acid group.

The acid value of free acid of the polymer (b) used in the present invention is preferably not less than 60 mgKOH/g, more preferably 65 to 350 mgKOH/g as this range of acid value is the most effective for enhancing storage stability and jetting performance of the recording liquid. In the case of use for employing exclusive paper alone such as "large format" application, the acid value of free acid of the polymer (b) usable in such case is preferably 50 to 150, more preferably 50 to 100. On the other hand, in the case of use for employing normal paper and exclusive paper such as "desk top" application, the acid value of free acid of the polymer (b) usable in such case is preferably not less than 100, more preferably 120 to 400. Further, in view of stability of jetting performance of the recording liquid, the weight-average molecular weight of the said polymer (b) is 5000 to 300,000. The lower limit of the weight-average molecular weight of the said polymer (b) is preferably 7,000, more preferably 10,000, especially preferably 15,000. The upper limit of the weight-average molecular weight of the said polymer (b) is preferably 45,000, more preferably 30,000, especially preferably 20,000. When the weight-average molecular weight of the said polymer (b) is within the above range, the effect of the present invention, especially excellent keeping quality and rubbing resistance can be attained.

It is possible to add various additives in the recording liquid according to the present invention. For example, various types of anionic surfactants, nonionic surfactants, cationic surfactants, ampholytic surfactants, water-soluble polymers and the like can be added.

The anionic surfactants usable in the present invention include fatty acid salts, alkylsulfuric ester salts, alkylbenzenesulfonates, alkylnaphthalenesulfonates, alkylsulfosuccinates, alkyldiphenyl ether disulfonates, alkylphosphates, polyoxyethylenealkylsulfonic ester salts, polyoxyethylenealkylarylsulfonic ester salts, alkanesulfonates, naphthalenesulfonic acid-formalin condensate, polyoxyetuhylenealkylphosphoric esters, N-methyl-N-oleoyltaurates, and α-olefinsulfonates.

The nonionic surfactants are not specified, but in view of storage stability and print density, it is preferable to use those having an ethylene oxide or propylene oxide structure, especially those with HLB in the range of 9 to 17, preferably 10 to 16.

Examples of the nonionic surfactants suited for use in the present invention include: polyoxyethylenenonylphenyl ether, polyoxyethyleneoctylphenyl ether, polyoxyethylene alkyl ether, polyoxyethylenelauryl ether, polyoxyethyleneoleyl ether, polyoxyethylenetridecyl ether, polyoxyethylenecetyl ether, polyoxyethylenestearyl ether, polyoxyethylene alkylamine, aminopolyoxyethylene, sorbitan fatty acid esters, polyoxyethylene sorbitan laurate, polyoxyethylene sorbitan palmitate, polyoxyethylene sorbitan stearate, polyoxyethylene sorbitan oleate, naphthol-ethylene oxide adduct, acetylene glycol-ethylene oxide adduct, bisphenol A-ethylene oxide adduct, oxyethylene-oxypropylene block polymer, sorbitan fatty acid esters, polyoxyethylene sorbitan fatty acid esters, polyoxyethylene sorbitol fatty acid esters, glycerin fatty acid esters, polyoxyethylene fatty acid esters, and polyoxyethylene alkylamine.

As for the cationic surfactants and ampholytic surfactants, they include alkylamine salts, quaternary ammonium salts, alkylbetains, aminoxides and the like.

In the present invention, a polymer (c) other than polymer (b) may be used with the said polymer (b). The polymer (c) is preferably a water-soluble polymer, more preferably an anionic water-soluble polymer. The acid value of free acid of the anionic water-soluble polymer as polymer (c) is usually not less than 150 mgKOH/g, preferably not less than 200 mgKOH/g, more preferably not less than 250 mgKOH/g, in view of storage stability of the recording liquid. Further, the copolymers having a hydrophobic group are preferred in terms of dispersing stability of carbon black and water fastness and rubbing resistance of the prints.

Examples of the hydrophobic groups in the polymers are the organic groups having an aromatic ring such as phenyl group, benzyl group, naphthyl group, etc., which may be substituted, and alkyl group, alkenyl group, alkinyl group, cycloalkyl group, etc., which have 4 or more carbon atoms and may be branched or substituted. The organic groups having an aromatic ring are preferred.

More specifically, the anionic water-soluble polymers usable in the present invention include (α-methyl)styrene/maleic acid copolymer, (α-methyl)styrene/(meth)acrylic acid copolymer, (α-methyl)styrene/(meth)acrylic ester/(meth)acrylic acid copolymer, (meth)acrylic ester/(meth)acrylic acid copolymer, (meth)acrylic ester/maleic acid copolymer and/or their salts. Among them, (α-methyl)styrene/(meth)acrylic acid copolymer is preferred. Here, "(α-methyl)styrene" denotes "α-methylstyrene and/or styrene", and "(meth)acrylic acid" means "methacrylic acid and/or acrylic acid".

The anionic water-soluble polymer used in the present invention may be a black polymer, a graft polymer or a random polymer, but a graft or random polymer, especially random polymer is preferred for the reason of production cost. The weight-average molecular weight of these polymers is preferably not more than 50,000, more preferably not more than 15,000, even more preferably not more than 10,000, in view of stability of jetting performance of the recording liquid. The copolymers with an acid value of not less than 150 mgKOH/g can be used in the form of salts of alkaline metals such as Li, Na and K, or salts of organic amines such as ammonia, dimethylamine and (mono-, di- or tri-)ethanolamine.

The above-said types of polymers or polymer solutions are commercially available under the trade names of "Joncryl 67", "678", "680", "682", "690" and/or their salts, "Joncryl 52", "57", "50", "63", "70", "354", "501", "6610", etc. (all products by Johnson Polymer Ltd.).

As the medium for the recording liquid according to the present invention, usually a water-based aqueous medium is used. Such a medium is preferably prepared by adding a water-soluble organic solvent to water.

Examples of the said water-soluble organic solvents include ethylene glycol, propylene glycol, 1,3-propanediol, butylene glycol, diethylene glycol, triethylene glycol, polyethylene glycol ("#200", "#300", "#400", "#4000", "#6000", etc., by Waco Pure Chemicals Co., Ltd.), glycerin, N-methylpyrrolidone, 1,3-dimethylimidazoline, thiodiglycol, 2-pyrrolidone, sulphorane, dimethyl sulfoxide, diethanolamine, triethanolamine, methanol, ethanol, isopropanol, neopentyl alcohol, trimethylolpropane and 2,2-dimethylpropanol.

In the present invention, it is possible to use low-molecular weight nonionic surfactants for reducing surface tension of the recording liquid and for improving ink penetration into the paper surface and drying of the recording.

Listed below are examples of the low-molecular weight nonionic surfactants usable in the present invention: ethylene glycol monomethyl ether, ethylene glycol dimethyl ether, ethylene glycol monoethyl ether, ethylene glycol diethyl ether, ethylene glycol mono-n-propyl ether, ethylene glycol monoisopropyl ether, ethylene glycol mono-n-butyl ether, ethylene glycol mono-sec-butyl ether, ethylene glycol monoisobutyl ether, ethylene glycol mono-tert-butyl ether, ethylene glycol mono-n-amyl ether, ethylene glycol mono-n-hexyl ether, propylene glycol monomethyl ether, propylene glycol dimethyl ether, propylene glycol monoethyl ether, propylene glycol diethyl ether, propylene glycol mono-n-propyl ether, propylene glycol monoisopropyl ether, propylene glycol mono-n-butyl ether, propylene glycol mono-sec-butyl ether, propylene glycol monoisobutyl ether, propylene glycol mono-tert-butyl ether, diethylene glycol monomethyl ether, diethylene glycol dimethyl ether, diethylene glycol monoethyl ether, diethylene glycol mono-n-propyl ether, diethylene glycol monoisopropyl ether, diethylene glycol mono-n-butyl ether, diethylene glycol mono-sec-butyl ether, diethylene glycol monoisobutyl ether, diethylene glycol mono-tert-butyl ether, dipropylene glycol monomethyl ether, dipropylene glycol monoethyl ether, dipropylene glycol mono-n-propyl ether, dipropylene glycol mono-n-butyl ether, polyethylene glycol monopropyl ether, polyethylene glycol monobutyl ether, ethylene glycol adducts of glycerin (example: Liponic EG-1 produced by Lipochemical Co., Ltd.), and ethylene glycol adducts of acetylene glycols (examples: Surfynol 440, 465 and 485 produced by Nisshin Chemical Industries Co., Ltd.), Acetylenol EH and EL produced by Kawaken Fine Chemical Co., Ltd.).

Such a low-molecular weight nonionic surfactant is used in an amount of usually 0.5 to 50 parts by weight, preferably 2 to 30 parts by weight, more preferably 5 to 20 parts by weight, to 100 parts by weight of the recording liquid. Surface tension of the recording liquid can be controlled as desired by properly selecting the type and the amount of the low-molecular weight nonionic surfactant used, but in the case of the recording liquid of the present invention, its surface tension needs to fall within the range of 25 to 54 dyne/cm. If the surface tension exceeds 54 dyne/cm, when the recording liquid is used for printing, the permeating speed of the recording liquid into the recording material becomes slow and it is not preferable to require lower printing speed in the printing. On the other hand, if the surface tension is less than 25 dyne/cm, the permeation of the recording liquid into the recording material becomes too large, the printing density may be deteriorated. In case where surface tension is not less than 25 dyne/cm and less than 37 dyne/cm in the above range, an urethane-based resin is preferably used as polymer (b) in view of storage stability and rubbing resistance, and in case where surface tension is not less than 37 dyne/cm and less than 54 dyne/cm, a polymer having an acrylamide derivative and/or a methacrylamide derivative as part of the structural units is preferably used as polymer (b).

When viewed from the type of printing paper, in the case of use for employing normal paper and exclusive paper such as "desk top" application, the surface tension of the recording liquid is usually not less than 37 dyne/cm, preferably not less than 40 dyne/cm, more preferably 40 to 50 dyne/cm in view of printing density, and the case of use for employing exclusive paper alone such as "large format" application, the surface tension of the recording liquid is usually less than 37 dyne/cm, preferably not more than 35 dyne/cm, more preferably 30 to 35 dyne/cm in view of printing density and printing speed.

In the recording liquid of the present invention, it is also possible to add where necessary other additives such as antiseptic, mildewproofing agent, germicide, pH adjuster, urea, etc.

The recording liquid of the present invention can be produced according to the conventional methods, for example, a method (masterbatch method) which comprises dispersing a polymer (b) and a pigment (a) in the presence of the necessary additives such as mentioned above in a medium to prepare a high-concentration dispersion, and adding a medium to this dispersion to adjust the concentration, or a method in which a polymer (b) and a pigment (a) are simply dispersed in a medium in the presence of the necessary additives. The masterbatch method is more efficient as dispersion is conducted in a high concentration.

As the dispersing means, there can be used, for example, ball mill, roll mill, sand grinding mill, and jet mills such as nanomizer and ultimizer which are capable of grinding the material without using any medium. Sand grinding mill or jet mill which has no fear of causing contamination by the medium is preferably used. In the present invention, after grinding and dispersion by the said dispersing means, the dispersion is filtered or centrifuged to remove coarse particles.

In the present invention, pigment (a) is used in an amount of usually 1 to 10% by weight, preferably 2 to 8% by weight, more preferably 2 to 6% by weight, based on the overall weight of the recording liquid. Polymer (b), which has at least one type of bond selected from the group consisting of amide bond, urethane bond and urea bond in the molecule and has an acid value of not less than 55 mgKOH/g, is used in an amount of usually 5 to 200% by weight, preferably 8 to 100% by weight, more preferably 8 to 70% by weight, based on the weight of polymer (a). Also, a water-soluble organic solvent such as mentioned above is used in an amount of usually 5 to 30% by weight, preferably 5 to 20% by weight, more preferably 8 to 20% by weight (as the ratio in the recording liquid) in view of storage stability of the recording liquid.

The average particle size of the pigment in the recording liquid is usually 0.01 to 0.3 μm, preferably 0.05 to 0.2 μm, more preferably 0.1 to 0.2 μm, in view of dispersing stability, stability of jetting performance and recording optical density. The maximum particle size of the pigment is preferably not more than 5 μm in view of dispersing stability and stability of jetting performance. Standard deviation in the dispersed particle size distribution of the pigment in the recording liquid is usually not more than 70 nm, preferably within the range of 5 to 50 nm, more preferably 10 to 50 nm, in view of storage stability and stability of jetting performance of the recording liquid and recording optical density.

The said average dispersed particle size and dispersed particle size distribution were determined by a particle size distribution meter Microtrack UPA150 available from Nikkiso Ltd.

The recording liquid of the present invention can be used not only for ink jet recording and writing with hand writing instruments but also as recording liquid for other purposes. The recording liquid of the present invention, however, is best suited for ink jet recording. The recording materials (the materials on which recording is made) are roughly divided into two types of paper: normal paper of a single layer structure comprising cellulose, loading material, sizing agent, etc., and special (exclusive) paper of a multilayer structure having an ink receiving layer on at least one side of the support. The recording liquid of the present invention can be used for all types of recording materials (normal paper, recycled paper, exclusive paper for ink jet printing (coated paper, glossy paper, etc.), exclusive films for ink jet printing (coated film, glossy film, etc.), OHP film, etc.).

The ink jet recording method according to the present invention is explained. In the present invention, it is possible to use all types of ink jet recording method such as on-demand system, continuous system, piezo system and thermal system.

In the present invention, a recording sheet having an ink receiving layer on at least one side of the support is used.

The support is base paper produced by mixing the main components comprising wood pulp (chemical pulp, mechanical pulp, wastepaper pulp, etc.) and a pigment with additive materials such as binder, sizing agent, primer, yield improver, cationizing agent, paper strength reinforcing agent, etc., and processing the mixture by a suitable paper making machine such as wiper paper machine, cylinder paper machine, twine-wire paper machine, etc. It is also possible to use art paper, coated paper, cast coated paper, and paper having a layer of a resin such as polyolefin. The support may be a film (or sheet) comprising a synthetic resin such as polyethylene, polypropylene, polyester, nylon, rayon, polyurethane, polyethylene terephthalate, or a mixture thereof. An appropriate support is selected in consideration of the object of recording, purpose of use of the recording (prints), adhesion to the ink receiving layer and other factors.

The ink receiving layer is formed by applying on the support surface a binder resin in which the fine inorganic particles (white pigment) are dispersed.

As the fine inorganic particles, there can be used, for example, light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, synthetic amorphous silica, aluminum hydroxide, lithopone, zeolite, hydrated halloysite, magnesium hydroxide, alumina sol, fumed silica, colloidal silica and the like. It is also possible to use colloidal silica coated with a cationic modifier comprising a metal oxide hydrate such as aluminum oxide hydrate, zirconium oxide hydrate, tin oxide hydrate, etc. Two or more types of these fine inorganic particles may be used in admixture. The average size of these inorganic particles is selected from an appropriate range depending on the type of paper, either glossy paper or matte paper, to be used for recording.

The binder resins usable as an additive include polyvinyl alcohol, vinyl acetate, oxidized starch, etherified starch, cellulose derivatives such as carboxymethyl cellulose and hydroxyethyl cellulose, maleic anhydride resins, conjugated diene-based polymer latexes such as styrene-butadiene copolymer and methyl methacrylate-butadiene copolymer, acrylic polymer latexes such as (co)polymers of (meth) acrylic esters, functional group-modified polymer latexes from the monomers containing functional groups such as carboxyl group of various types of polymers, polymethyl acrylate, polyurethane resins, vinyl chloride-vinyl acetate copolymer, polyvinyl butyral, casein, gelatin, soybean protein, silyl-modified polyvinyl alcohol, unsaturated polyester resins, and other thermosetting synthetic resins such as alkyl resins, melamine resins and urea resins.

In the present invention, it is possible to use a cationic organic material for the purpose of enhancing anchorage of carbon black as colorant. Examples of such cationic organic materials are quaternary ammonium salts, amines such as alkylamine, and amides. Polymers having such cationic residues in the side chain are also usable as cationic organic material.

Other additives that can be blended as desired in the support include pigment dispersant, thickener, fluidity improver, defoaming agent, foam-inhibitor, release agent, foaming agent, penetrating agent, color dye, color pigment, fluorescent brightener, antioxidant, antiseptic, mildewproofing agent, water fastness imparting agent, wet paper strength reinforcing agent and the like.

The ink receiving layer can be formed by using various types of known coating devices such as blade coater, roll coater, air knife coater, bar coater, rod blade coater, curtain coater, short dowel coater and size press.

The ink receiving layer is preferably a porous layer. The average pore diameter of the porous layer is usually not less than 0.5 µm, preferably not less than 1 µm, more preferably 2 µm in view of print density and rubbing resistance. "Average pore diameter" referred to herein means arithmetic average (number-average) diameter that was determined by taking scanning electron microphotographs of the recording sheet surface at plural magnifications and, after digitalizing the microphotographs by scanner input method, calculating the distribution of the diameters of the circles having the areas equal to those of the respective voids extracted by computer image analysis.

The above-described recording liquid according to the present invention is particularly useful for recording with the recording sheets having a matte type ink receiving layer with relatively high surface roughness. Therefore, S.A.D. (surface area difference) of the ink receiving layer surface is set to be usually not less than 50, preferably not less than 60, more preferably not less than 70. This range of S.A.D. allows obtainment of the prints with very high optical density and excellent rubbing resistance.

S.A.D. mentioned above is an index of surface roughness. Specifically, it represents the specific surface area of a surface and is defined by the following equation (1). In the present invention, S.A.D. is determined under the conditions shown as follows.

$$S.A.D = \{(\Sigma Si/\Sigma Pi)-1\} \times 100(\%) \quad (1)$$

Si: area of any one of the triangles formed by three adjacent data points;
Pi: area provided when Si is projected on the XY plain;
Σ Si: sum of all Si's;
Σ Pi: sum of all Pi's <Measuring Method>
Apparatus: Scanning probe microscope
Type: NanoScope III mfd. by Digital Instruments Inc.
Scanner: J-Head
Measuring region: 1 µm×1 µm
Number of pixels: 512×512
Scan rate: 1 Hz
Measuring mode: Tapping AFM
Probe: NCH-W mfd. by Digital Instruments Inc.

As explained above, according to the present invention, there is provided a recording liquid which has excellent storage stability and jetting performance and is also capable of providing high print density and forming prints with high rubbing resistance, water fastness and light fastness even when it is used for recording on normal paper by an ink jet printer or a hand writing instrument.

EXAMPLES

The present invention will be described in further detail with reference to the examples thereof, but it is to be understood that these examples are merely intended to be illustrative and not to be construed as limiting the scope of the invention in any way. In the following Examples and Comparative Examples, all "parts" and "%" are by weight unless otherwise noted. The carbon black used and the methods of determination and evaluation of the properties are as described below.

(1) Printing Test:
An ink jet printer was charged with the recording liquid and solid printing was conducted on exclusive paper for ink jet printer (matte paper and glossy paper) and/or normal paper (copying paper) and evaluated according to the following three-grade rating formula.

Good: There were no white dots and the print quality at the edges was also high.
Fair: There were slight white dots, which however presented no practical problem.
Poor: There were numerous white dots.

(2) Evaluation of Print Density:

Density of the prints obtained in the above printing test was measured by a Macbeth densitometer (RD 914). A greater numerical value indicates a higher print density. The result was judged as passable when a print density of 1.5 or more was obtained.

(3) Rubbing Resistance Test:

Using the prints obtained in the above printing test, the solid print portion was lightly rubbed with a metallic spoon after the recording liquid has been dried and fixed, and rubbing resistance of the recording liquid was evaluated according to the following three-grade rating formula.

Good: There took place no fall-off of the recording liquid and the surface of the recording material was not exposed out.
Fair: A slight degree of fall-off of the recording liquid was observed, but this offered no practical problem.
Poor: Excessive fall-off of the recording liquid occurred.

(4) Marker Tolerance Test:

Using the prints obtained in the above printing test and 24 hours after this test, the letter portion was traced by a commercial yellow fluorescent marker (Optex produced by Zebra Co., Ltd.), and marker tolerance of the ink was evaluated according to the following three-grade rating formula.

Good: There was substantially no fouling of the letter portion traced by the marker.
Fair: There was slight fouling of the letter portion traced by the marker, but this presented no practical problem.
Poor: There was excessive fouling of the letter portion fretted by the marker.

(5) Measurement of Dispersed Particle Size Distribution:

The recording liquid was diluted with ion exchange water, and the dispersed particle size distribution was measured by a particle size distribution meter (Microtrack UPA150 available from Nikkiso Co., Ltd.).

(6) Measurement of Average Pore Diameter of Ink Receiving: Layer and Average Particle Size of white Pigment:

First, a scanning electron microphotograph (post-enlargement magnification: ×150) of the recording sheet surface was input at 360 dpi from a scanner and computer processed into a digital image. The value of one pixel was equivalent to 0.465 μm. 6 sheets of image with 512×512 pixels were processed similarly, and the total 1,723 pores (voids) were extracted. The diameters of the circles having the same areas as those of the respective extracted pores (equi-areal circle diameters) were measured, and from the distribution of these measured diameters the average pore diameter (number-average value) was determined. The result of measurement on the commercially available special ink jet recording paper offered to the printing test is shown in Table 1.

TABLE 1

|  | MC matte paper (Epson) |
|---|---|
| Average pore diameter of ink receiving layer (μm) | 4.85 |
| S.A.D. | 93.4 |

(7) S.A.D. of Ink Receiving Layer:

Measurement was made at 5 points (5 regions) of the ink receiving layer surface by the method described in the text, and the average value of 5 measurements was used. The result of measurement on the commercially available special ink jet recording paper offered to the printing test is shown in Table 1.

(8) Surface Tension:

Interfacial tension of the recording liquid was determined by using a Wilhelmy's surface tensiometer CBVP-Z (mfd. by Kyowa Kyomen Kagaku KK).

Polymer Compound Synthesis Example 1

200 parts of ethanol was supplied into a four-necked flask equipped with a reflux condenser, a thermometer, a glass tube for nitrogen replacement and a stirrer, and after adding 2 parts of azobisisobutyronitrile (AIBN), the mixture was refluxed under heating at 80° C. in a stream of nitrogen. To this reactor, a mixture of 25 parts of dimethylacrylamide, 44 parts of benzyl methacrylate, 31 parts of methacrylic acid and 5 parts of laurylmercaptan was added dropwise over a period of 2 hours. After the completion of dropwise addition, 0.5 part of AIBN was further added and the mixture was polymerized for 4 hours, after which ethanol was removed to obtain a polymer compound.

To determine the acid value of this polymer compound, 1 g of sample was collected, dissolved in a water/ethanol (50 g/50 g) mixed solvent and subjected to neutralization titration with a 0.1 N KOH solution. Titration was carried out by the potentiometric titration method of JIS KO113, with the end point being determined by the inflection point method of KIS K0113 5.2.2. The amount of KOH required for the titration was shown as acid value. It was thus found that the acid value of the said polymer compound was 200 mgKOH/g.

Then a sodium hydroxide solution was added dropwise to the flask under cooling to neutralize the product, and thereafter ethanol was removed to obtain an aqueous solution of an anionic polymer A. This polymer had a weight-average molecular weight of 7,000, and the ratio of the monomer having an amide bond in the polymer was 29 mol % while the ratio of the monomer having a hydrophobic group in the polymer was 29 mol %.

Polymer Synthesis Example 2

The same procedure as defined in Synthesis Example 1 was conducted except for use of a mixture comprising 15 parts of dimethylacrylamide, 54 parts of benzyl methacrylate, 31 parts of methacrylic acid and 5 parts of laurylmercaptan to obtain a polymer having an acid value of 200 mgKH/g. Then a sodium hydroxide solution was added dropwise to the flask under cooling to neutralize the product, and thereafter ethanol was removed to obtain an aqueous solution of an anionic polymer B. This polymer had a weight-average molecular weight of 7,500, and the ratio of the monomer having an amide bond in the polymer was 18 mol % while the ratio of the monomer having a hydrophobic group in the polymer was 38 mol %.

Polymer Synthesis Example 3

The same procedure as defined in Synthesis Example 1 was conducted except for use of a mixture comprising 45 parts of dimethylacrylamide, 24 parts of benzyl methacrylate and 31 parts of methacrylic acid to obtain a polymer having an acid value of 200 mgKOH/g. Then a sodium hydroxide solution was added dropwise to the flask under cooling to neutralize the product, after which ethanol was removed to obtain an aqueous solution of an anionic polymer C. This polymer had a weight-average molecular weight of 33,000, and the ratio of the monomer having an amide bond in the polymer was 48 mol % while the ratio of the monomer having a hydrophobic group in the polymer was 14 mol %.

Polymer Synthesis Example 4

The same procedure as defined in Synthesis Example 1 was conducted except for use a mixture comprising 45 parts of dimethylacrylamide, 24 parts of benzyl methacrylate, 31 parts of methacrylic acid and 2 parts of laurylmercaptan to obtain a polymer having an acid value of 200 mgKH/g. Then a sodium hydroxide solution was added dropwise to the flask under cooling to neutralize the product, and thereafter ethanol was removed to obtain an aqueous solution of an anionic polymer D. This polymer had a weight-average molecular weight of 11,500, and the ratio of the monomer having an amide bond in the polymer was 48 mol % while the ratio of the monomer having a hydrophobic group in the polymer was 14 mol %.

Example 1

The components shown in Table 2 were dispersed by a sand grinder using zirconia beads having an average diameter of 0.6 mm.

TABLE 2

| Components | Amount used (parts) |
|---|---|
| Carbon black A (nitrogen-adsorbed specific surface area: 290 m$^2$/g, DBP oil absorption of 150 mL/100 g, primary particle size: 14 nm) | 9.0 |
| Styrene-acrylic acid copolymer (20 wt % aqueous solution of ammonium salt of Joncryl 678 produced by Johnson Polymer Ltd. (acid value: 215; Mw: 8500)) | 4.5 |
| Glycerin | 5.0 |
| Ion exchange water | 81.5 |
| Total | 100 |

A polyesterdiol synthesized by using adipic acid and neopentyl glycol as starting materials, dimethylolpropionic acid and isophorone diisocyanate were polymerized and then neutralized with triethylamine to obtain a polyester-based urethane resin (acid value of free acid: 70; Tg=190° C.; Mw=200,000). To a liquid obtained from the composition of Table 2 were added 5.4 parts of the above polyester-based urethane resin with an acid value of 70, 22.5 parts of glycerin, 22.5 parts of diethylene glycol monobutyl ether and 74.6 parts of ion exchange water. This liquid was filtered by No. 5C filter paper under pressure, and the thus obtained liquid was designated as recording liquid. The average dispersed particle size of carbon black in this recording liquid was 0.139 μm and its surface tension was 33 dyne/cm. Other test results are shown in Tables 5 and 6.

Example 2

To a liquid obtained in the same way as in Example 1, there were further added 2.25 parts of the polyester-based urethane resin with an acid value of 70, 9 parts of glycerin, 12.6 parts of 2-pyrrolidone, 3.6 parts of isopropyl alcohol and 52.55 parts of ion exchange water. This liquid was filtered by No. 5C filter paper under pressure, and the thus obtained liquid was offered as recording liquid. The average dispersed particle size of carbon black in the obtained recording liquid was 0.137 μm and its surface tension was 48 dyne/cm. Other test results are shown in Tables 5 and 6.

Comparative Example 1

The same procedure as defined in Example 1 was conducted except that a polyester-based polyurethane resin with an acid value of 50 was used in place of the polyester-based polyurethane resin with an acid value of 70 to prepare a recording liquid and it was evaluated. The average dispersed particle size of carbon black in the obtained recording liquid was 0.138 μm and its surface tension was 34 dyne/cm. Other test results are shown in Table 5, but the rubbing resistance test could not be conducted because of defective printing.

Comparative Example 2

The same procedure as defined in Example 1 was conducted except that a polyester-based polyurethane resin with an acid value of 50 was used in place of the polyester-based polyurethane resin with an acid value of 70 to prepare a recording liquid and it was evaluated. The average dispersed particle size of carbon black in the obtained recording liquid was 0.140 μm and its surface tension was 33 dyne/cm. The printing test result is shown in Table 5, but the rubbing resistance test could not be conducted because of defective printing.

Example 3

The same procedure as defined in Example 1 was conducted except that carbon black A was replaced by carbon black B having a nitrogen-adsorbed specific surface area of 350 m$^2$/g, a DBP oil absorption of 86 mL/100 g and a primary particle size of 12 nm to prepare a recording liquid and it was evaluated. The average dispersed particle size of carbon black in the obtained recording liquid was 0.140 μm and its surface tension was 35 dyne/cm. Other test results are shown in Tables 5 and 6.

Example 4

The components shown in Table 3 were dispersed by a sand grinder using zirconia beads having an average diameter of 0.6 mm.

TABLE 3

| Components | Amount used (parts) |
|---|---|
| Carbon black A | 5.0 |
| Styrene-acrylic acid copolymer (20 wt % aqueous solution of potassium salt of Joncryl 678 produced by Johnson Polymer Ltd. (acid value: 215; Mw: 8500)) | 2.5 |
| Glycerin | 3.0 |
| Ion exchange water | 53.5 |
| Total | 64 |

To the resulting liquid were added 3.8 parts of an aqueous solution of polymer A obtained in Synthesis Example 1 (polymer: 1.25 part), 2 parts of isopropyl alcohol, 7 parts of 2-pyrrolidone and 18.2 parts of ion exchange water. This liquid was filtered by No. 5C filter paper under pressure, and the thus obtained liquid was offered as recording liquid. The average dispersed particle size of carbon black in this recording liquid was 0.143 µm and its surface tension was 50 dyne/cm. Other test results are shown in Table 7.

Example 5

The same procedure as defined in Example 4 was conducted except that 3.8 parts of an aqueous solution of polymer A (polymer: 1.25 part) was replaced by 3.8 parts of an aqueous solution of polymer B obtained in Synthesis Example 2 (polymer: 1.25 part) to obtain a recording liquid. The average dispersed particle size of carbon black in this recording liquid was 0.138 µm and its surface tension was 50 dyne/cm. Other test results are shown in Table 7.

Example 6

The components shown in Table 4 were dispersed by a sand grinder using zirconia beads having an average diameter of 0.6 mm.

TABLE 4

| Components | Amount used (parts) |
|---|---|
| Carbon black A | 4.0 |
| Styrene-acrylic acid copolymer (20 wt % aqueous solution of potassium salt of Joncryl 678 produced by Johnson Polymer Ltd. (acid value: 215; Mw: 8500)) | 2.0 |
| Glycerin | 3.0 |
| Ion exchange water | 42.2 |
| Total | 51.2 |

To the resulting liquid were added 6.1 parts of an aqueous solution of polymer B obtained in Synthesis Example 2 (polymer: 2.0 parts), 5 parts of glycerin, 2 parts of isopropyl alcohol, 7 parts of 2-pyrrolidone and 28.7 parts of ion exchange water. This liquid was filtered by No. 5C filter paper under pressure, and the thus obtained liquid was presented as recording liquid. The average dispersed particle size of carbon black in the obtained recording liquid was 0.139 µm and its surface tension was 48 dyne/cm. Other test results are shown in Table 7.

Example 7

To a dispersion obtained in the same way as in Example 6 were added 4.1 parts of an aqueous solution of polymer C obtained in Synthesis Example 3 (polymer: 1.0 part), 5 parts of glycerin, 2 parts of isopropyl alcohol, 7 parts of 2-pyrrolidone and 30.7 parts of ion exchange water. This liquid was filtered by No. 5C filter paper under pressure, and the thus obtained liquid was presented as recording liquid. The average dispersed particle size of carbon black in the obtained recording liquid was 0.311 µm and its surface tension was 52 dyne/cm. Other test results are shown in Table 7.

Example 8

To a dispersion obtained in the same way as in Example 6 were added 4.7 parts of an aqueous solution of polymer D obtained in Synthesis Example 4 (polymer: 1.6 part), 5 parts of glycerin, 2 parts of isopropyl alcohol, 7 parts of 2-pyrrolidone and 30.1 parts of ion exchange water. This liquid was filtered by No. 5C filter paper under pressure, and the thus obtained liquid was presented as recording liquid. The average dispersed particle size of carbon black in the obtained recording liquid was 0.176 µm and its surface tension was 51 dyne/cm. Other test results are shown in Table 7.

Example 9

To a dispersion obtained in the same way as in Example 6 were added 3.8 parts of an aqueous solution of polymer B obtained in Synthesis Example 2 (polymer: 1.25 part), 5 parts of glycerin, 4.0 parts of triethylene glycol monobutyl ether, 7 parts of 2-pyrrolidone and 39 parts of ion exchange water. This liquid was filtered by No. 5C filter paper under pressure, and the thus obtained liquid was presented as recording liquid. The average dispersed particle size of carbon black in the obtained recording liquid was 0.114 µm and its surface tension was 44 dyne/cm. Other test results are shown in Table 7.

TABLE 5

|  | Printing test | Print density |
|---|---|---|
| Example 1 | Good | 1.6 |
| Example 2 | Fair | — |
| Comp. Example 1 | Poor | — |
| Comp. Example 2 | Poor | — |
| Comp. Example 3 | Good | 1.4 |

(Recording paper used in the test: MC matte paper)

TABLE 6

|  | Example 1 | Example 2 | Example 3 |
|---|---|---|---|
| Matte paper |  |  |  |
| MC matte paper (Epson) | Good | — | Good |
| MJA 4 SP 1 (Epson) | Good | — | Good |
| Glossy paper |  |  |  |
| HG 201 (Canon) | Good | — | Good |
| HG 101 (Canon) | Good | — | Good |
| MJA 4 SP 6 (Epson) | Good | — | Good |
| C 6043 A (Hewlet Packard) | Good | — | Good |
| Normal paper |  |  |  |
| Xerox 4024 (Xerox) | Good | Good | Good |
| Xerox 4200 (Xerox) | Good | Good | Good |

TABLE 7

|  | Printing test | Print density | Tolerance to marker |
|---|---|---|---|
| Example 4 | Good | 1.59 | Fair |
| Example 5 | Good | 1.55 | Fair |
| Example 6 | Good | 1.40 | Good |
| Example 7 | Good | 1.53 | Fair |
| Example 8 | Good | 1.43 | Good |
| Example 9 | Good | 1.28 | Good |

(Recording paper used in the test: Xerox 4024)

What is claimed is:

1. A recording liquid comprising at least:
    a pigment (a);
    a polymer (b) having one or more types of bond selected from the group consisting of urethane bond and urea bond in the molecule, having a weight-average molecular weight of 7000 to 300000 and having an acid value of free acid of not less than 55 mgKOH/g and less than 150 mgKOH/g, and a polymer (c) other than polymer (b); wherein polymer (c) is a copolymer, wherein the ratio of polymer (b) to polymer (c) ranges from about 6:1 to about 2.5:1; and wherein the surface tension of said recording liquid ranges from 25 to 54 dyne/cm.

2. A recording liquid according to claim 1, wherein the polymer (b) is a urethane-based resin.

3. A recording liquid according to claim 1, whose surface tension is not less than 25 dyne/cm and less than 37 dyne/cm.

4. A recording liquid according to claim 3, wherein the polymer (b) is a urethane-based resin.

5. A recording liquid according to claim 1, whose surface tension is not less than 37 dyne/cm and less than 54 dyne/cm.

6. A recording liquid according to claim 1, wherein the polymer (c) is an anionic water-soluble polymer.

7. A recording liquid according to claim 1, wherein the acid value of free acid of the anionic water-soluble polymer is not less than 150 mgKOH/g.

8. A recording liquid according to claim 6, wherein the anionic water-soluble polymer is an ($\alpha$-methyl) styrene/(meth) acrylic acid copolymer.

9. A recording liquid according to claim 1, wherein the pigment (a) is carbon black.

10. A recording liquid according to claim 9, wherein the carbon black has a DBP oil absorption of not less than 100 $cm^3$/100 g.

11. A recording liquid according to claim 1 containing 0.5 to 50% by weight of a nonionic surfactant.

12. An ink jet recording method comprising using the recording liquid as defined in claim 1 on a recording sheet having an ink receiving layer on at least one side of the support.

* * * * *